United States Patent
Jawalekar

(10) Patent No.: US 7,866,984 B1
(45) Date of Patent: Jan. 11, 2011

(54) EPIDURAL AND COMBINED SPINAL EPIDURAL ANESTHESIA ADMINISTRATION INSTRUCTIONAL AID

(76) Inventor: Shreeniwas R. Jawalekar, 27 Sandstone Rd., Westford, MA (US) 01886

( * ) Notice: Subject to any disclaimer, the term of this patent is extended or adjusted under 35 U.S.C. 154(b) by 1246 days.

(21) Appl. No.: 11/381,126

(22) Filed: May 1, 2006

Related U.S. Application Data

(60) Provisional application No. 60/676,050, filed on Apr. 29, 2005.

(51) Int. Cl.
*G09B 23/28* (2006.01)

(52) U.S. Cl. ......................... 434/268; 434/267

(58) Field of Classification Search .................. 434/262, 434/267, 268, 272, 275
See application file for complete search history.

(56) References Cited

U.S. PATENT DOCUMENTS

| | | | | |
|---|---|---|---|---|
| 2,689,415 | A * | 9/1954 | Haver | 434/272 |
| 3,722,108 | A * | 3/1973 | Chase | 434/267 |
| 4,198,766 | A * | 4/1980 | Camin | 434/272 |
| 4,773,865 | A * | 9/1988 | Baldwin | 434/268 |
| 5,215,469 | A * | 6/1993 | Kohnke et al. | 434/268 |
| 5,320,537 | A * | 6/1994 | Watson | 434/272 |
| 5,775,916 | A * | 7/1998 | Cooper et al. | 434/267 |
| 5,839,904 | A * | 11/1998 | Bloom | 434/268 |
| 5,890,908 | A * | 4/1999 | Lampotang et al. | 434/268 |
| 6,234,804 | B1 * | 5/2001 | Yong | 434/267 |
| 6,336,812 | B1 * | 1/2002 | Cooper et al. | 434/267 |
| 7,534,107 | B2 * | 5/2009 | Bardsley et al. | 434/272 |
| 2003/0068606 | A1 * | 4/2003 | Nicholls et al. | 434/262 |

OTHER PUBLICATIONS

Jawalekar, Santos, A Procedure for Measuring the Length of the Catheter in the Epidural Space, Anesthesiology, Jul. 1982, pp. 67-68, vol. 57, No. 1, Lippincott Williams and Wilkins Publishers, US.

Leighton, A Greengrocer's Model of the Epidural Space, Anesthesiology, Feb. 1989, pp. 368-369, vol. 70, No. 2, Lippincott Williams and Wilkins Publishers, US.

Bromage, The epidural potato—and beyond, Anaesthesia, 1999, pp. 619-620, vol. 54, Blackwell Science Ltd, GB.

Allen, Meincke, Ramirez, Watts, Marienau, A Teaching Tool in Spinal Anesthesia, AANA Journal, Feb. 2003, pp. 29-36, vol. 71, No. 1, AANA Publishing, Inc., US.

Varaday, Leighton, Davies, Bottros, Do It Yourself—Epidural Model, Anesthesiology, 2005, p. 54, vol. 102, Supp 1, Lippincott Williams and Wilkins Publishers, US.

* cited by examiner

*Primary Examiner*—Kurt Fernstrom
(74) *Attorney, Agent, or Firm*—Steptoe & Johnson PLLC

(57) ABSTRACT

An anesthesia administration instructional aid comprises a pipe, a penetrable material in the pipe, and a reservoir located at a predefined distance from the penetrable material. A method for learning administration of epidural and combined spinal epidural anesthesia comprises the steps of: (a) obtaining an anesthesia administration instructional aid, wherein the instructional aid comprises a pipe, a penetrable material in the pipe, and a reservoir located at a predefined distance from the penetrable material; (b) filling a fluid into the reservoir; (c) inserting a larger needle having a lumen and a tip through the penetrable material such that the tip of the larger needle rests between the reservoir and the penetrable material; and (d) inserting a smaller needle having a tip through the lumen of the larger needle such that the tip of the smaller needle pierces and rests inside the reservoir.

7 Claims, 15 Drawing Sheets

US 7,866,984 B1

EPIDURAL AND COMBINED SPINAL EPIDURAL ANESTHESIA ADMINISTRATION INSTRUCTIONAL AID

CROSS-REFERENCES TO RELATED APPLICATIONS

This application claims the benefit of U.S. Provisional Application No. 60/676,050 filed Apr. 29, 2005.

BACKGROUND OF THE INVENTION

1. Field of the Invention

This invention relates to instructional aids, and in particular, to an apparatus and method that assists in the teaching of spinal, epidural (loss of resistance technique), and combined spinal epidural (C.S.E.) anesthesia administration.

2. Description of the Related Art

Learning regional anesthesia administration is typically more difficult than learning general anesthesia administration. The student is often anxious and fearful about performing the procedure, and the teacher is often reluctant and hesitant to allow the student to perform the procedure. There is a tendency on the part of the teacher to take over the procedure at the first sign of difficulty, thereby denying the student the instructional benefit of performing a complete spinal and/or epidural anesthesia administration.

There is currently no adequate instructional aid that allows the student to practice epidural and combined spinal epidural anesthesia administration prior to performing such procedures on human patients. Thus, there is a need for an epidural and combined spinal epidural anesthesia administration instructional aid that simulates the experience and "feel" of inserting the epidural needle (with the feel of loss of resistance), spinal needle, and epidural catheter in the soft tissue of a patient such that the needles and catheter are appropriately positioned for cerebrospinal fluid flow and anesthesia administration.

SUMMARY OF THE INVENTION

The present invention is directed to an apparatus and method that satisfies the need for an epidural and combined spinal epidural anesthesia administration instructional aid. An embodiment of the apparatus of the present invention comprises a pipe, a penetrable material in the pipe, a reservoir, and a space between the penetrable material and the reservoir. The penetrable material is preferably silicone sealant or other material having a similar consistency such that a needle inserted and pushed into the penetrable material meets with a resistance and "feel" approximating or mimicking that of soft tissue in the human body. The reservoir is preferably a piece of latex tubing with stopcocks at both ends. This apparatus is thus easy and inexpensive to produce, and the consumable parts or parts subject to wear and tear or degradation (e.g., through repetitive needle insertion over time), including the pipe with penetrable material and the reservoir, are easily replaced.

An embodiment of the method of the present invention comprises the steps of (a) filling a fluid into the reservoir of the apparatus of the present invention, (b) inserting a larger needle through the penetrable material such that the tip of the larger needle rests in the space (representing the epidural space), and (c) inserting a smaller needle through the lumen of the larger needle such that the tip of the smaller needle pierces and rests in the reservoir. The smaller needle is thereafter removed and a catheter threaded through the lumen of the larger needle and into the (epidural) space. A wooden silhouette of a female back preferably blocks the view of the reservoir and the space for the user of the present invention during the completion of the method, thereby more fully approximating the experience of performing epidural and combined spinal epidural anesthesia administration in a human patient. The wooden silhouette preferably has a hole through which the needles and catheter may be placed for insertion through the penetrable material.

BRIEF DESCRIPTION OF THE FIGURES

The present invention is described with reference to the accompanying drawings. In the drawings, like reference numbers indicate identical or functionally similar elements.

DETAILED DESCRIPTION OF THE PREFERRED EMBODIMENTS

Figure 1:
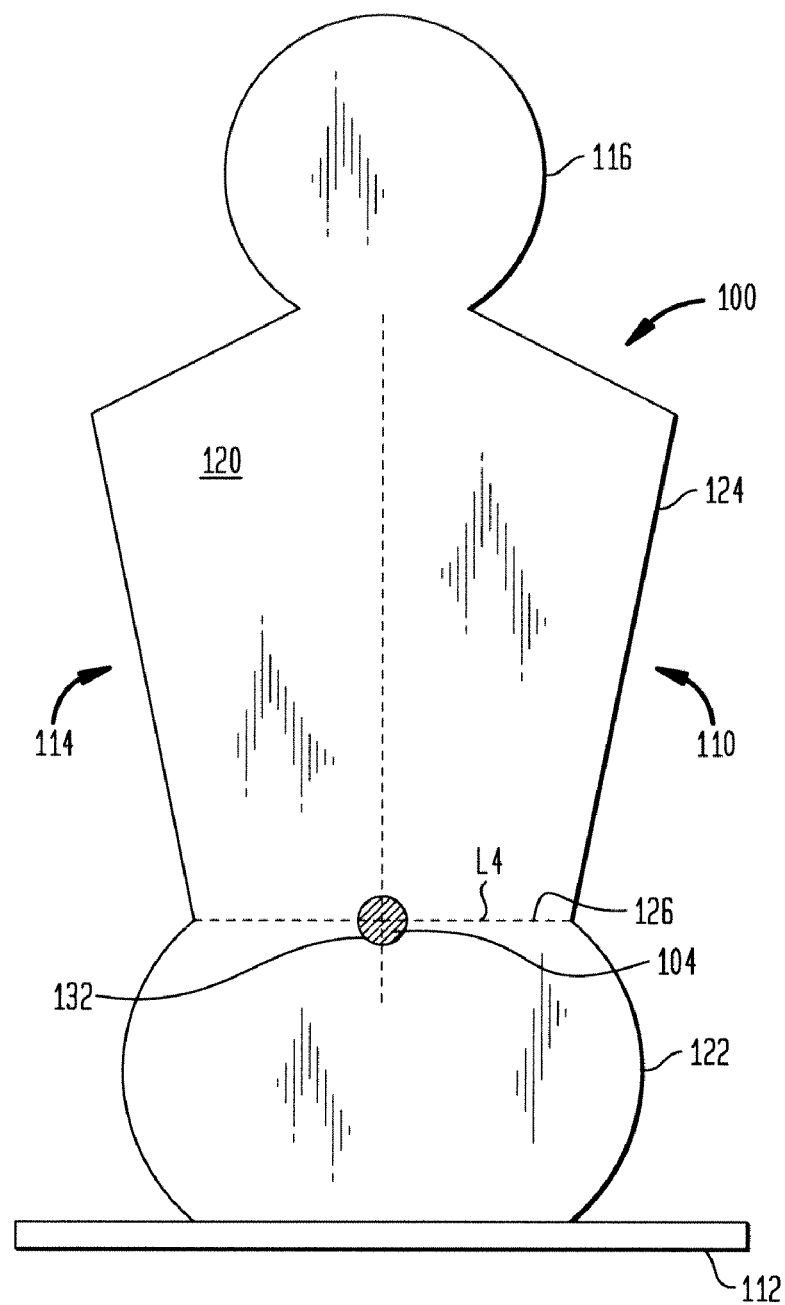
FIG. 1 is a back elevation view of an embodiment of an apparatus of the present invention.
Figure 2:
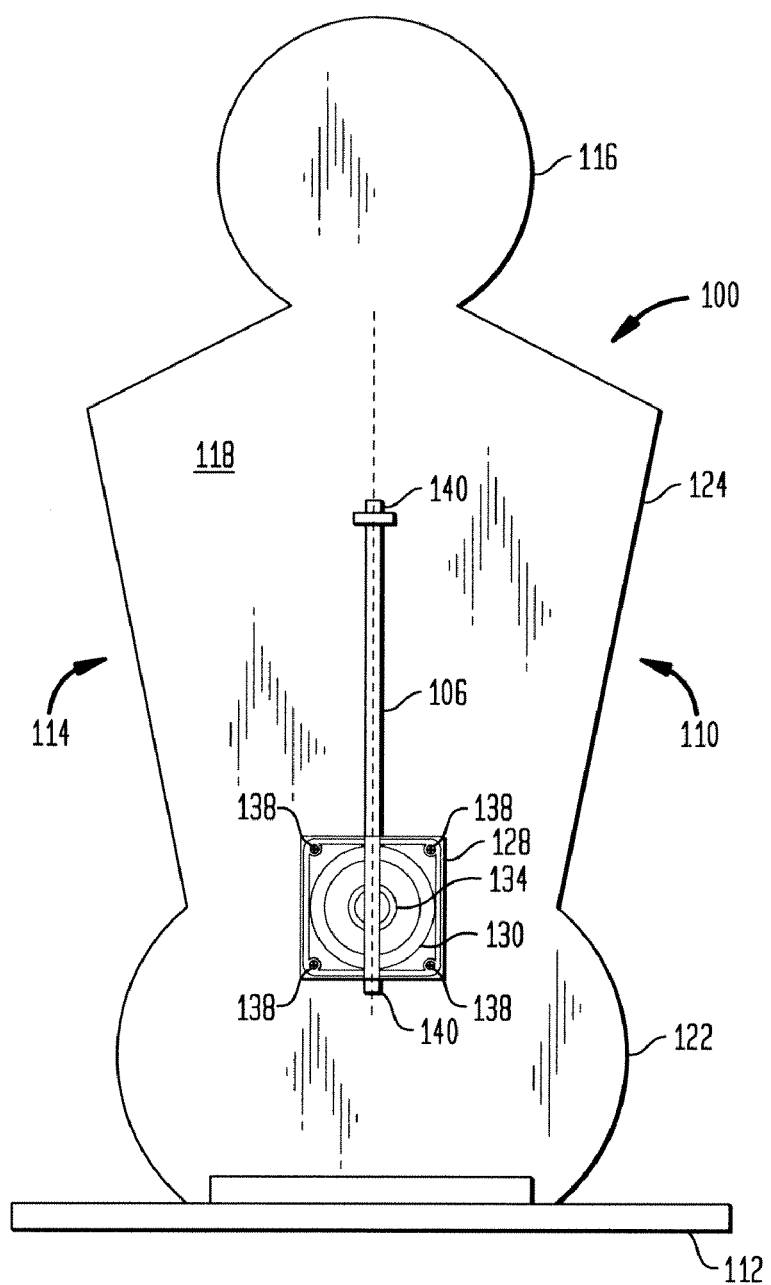
FIG. 2 is a front elevation view of the embodiment of FIG. 1.

As shown in FIGS. 1-15, an epidural and combined spinal epidural anesthesia administration instructional aid 100 comprises a pipe 102, a penetrable material in the pipe 102 such as silicone sealant 104, a reservoir such as a piece of latex tubing 106, and a space 108 having a predefined distance between the silicone sealant 104 and the latex tubing 106. The pipe 102 has a first end 132 and a second end 134 and is preferably cylindrical or tubular and made of hard plastic with a length of about 6.4 centimeters and a diameter of about 1.2 centimeters, although alternative shapes, materials, and dimensions can be used to hold the silicone sealant 104. The penetrable material is preferably silicone sealant 104, although alternative materials having a similar consistency can be used such that a needle inserted through the first end of the pipe 102 and pushed into the penetrable material meets with a resistance and "feel" approximating or mimicking that of soft tissue in the human body. The pipe 102 is filled with silicone sealant 104 which when dry is quite firm yet at the same time allows an eighteen gauge epidural needle to pass through it mimicking the resistance of soft tissue. The pipe 102 can be removed easily and replaced with a new one once the silicone sealant 104 is worn out and there is no feel of loss of resistance when inserting a needle through it.

The space 108 represents the epidural space in the human body. The space 108 preferably is empty space and preferably has a depth from the silicone sealant 104 to the latex tubing 106 of about 0.5 centimeters to about 0.6 centimeters. As a needle passes through the silicone sealant 104 it meets with a resistance approximating that of soft tissue. After the tip of the needle passes through the entire length of the silicone sealant 104, it exits the silicone sealant 104 and enters the space 108. At this point there is a loss of resistance, and the student or user of the instructional aid 100 learns to recognize the feeling of this loss of resistance and thus learns to cease pushing the needle further. The tip of the needle therefore comes to rest in the space 108.

The pipe 102 preferably penetrates through a frame, such as a wooden silhouette 110 in the shape of the back of a seated female. The wooden silhouette 110 has a base 112 designed to be placed on a table or other similar surface, a body portion 114 extending upward from the base 112 at an angle of about eighty degrees, and a head portion 116 atop the body portion 114. The body portion 114 of the silhouette 110 has a front side 118 and a back side 120, wherein the angle between the base 112 and the front side 118 is about eighty degrees. The body portion 114 of the silhouette 110 has a lower body portion 122 and an upper body portion 124 separated by an imaginary line 126 denoting the height of the L4 lumbar spinous process and iliac crests. This imaginary line may be noted on the back side 120 of the silhouette 110 by "L4" or similar notation or indication (including, for example, simulated vertebra). Other vertebrae above "L4" may be denoted by "L3", "L2", and "L1" or similar notation or indication on the back side 120 of the silhouette 110 in the upper body portion 124. Likewise, a vertebra below "L4" may be denoted by "L5" or similar notation or indication on the back side 120 of the silhouette 110 in the lower body portion 122.

The silhouette 110 preferably has a hole between or near the "L3" notation and the "L4" notation (interspace L3-4) sized to receive snugly or accommodate the pipe 102 such that the first end 132 of the pipe 102 sits flush or about flush with the back side 120 of the silhouette 110 and the second end 134 of the pipe 102 projects out from the front side 118 of the silhouette 110. The lumber area of the back side 120 of the silhouette 110 is preferably at least partially covered with a piece of nine inch by six inch latex held in place using a hook and loop fastener such as VELCRO. Alternative materials and dimensions may be used such that insertion of a needle into the latex or alternative material simulates or approximates the "feel" or resistance of insertion of a needle into skin. The student using the device is asked to select the best interspace for needle insertion by feel.

The second end 134 of the pipe 102 is preferably supported directly or indirectly by a box 128 attached to the front side 118 of the silhouette 110. An aperture in the box 128 aligns with the hole in the silhouette 110. A support 130, such as foam rings or collars placed within the box 128, surrounds and thereby supports the second end 134 of the pipe 102 in its proper position. The latex tubing 106 is placed in a vertical orientation against the support 130 and is held in its proper position by a clear box cover 136 attached to the box 128. The box cover 136 presses the latex tubing 106 against the support 130 and/or the box 128, thereby holding the latex tubing 106 in place. The box cover 136 is preferably attached to the box 128 using four corner screws 138 that are easily removed, thereby allowing the latex tubing 106 to be easily removed as necessary. The box cover 136 preferably is screwed to the box 128 such that a space remains between the box cover 136 and the box 128 to provide an open path for the latex tubing 106. The latex tubing 106 is easily replaced with replacement latex tubing when worn out. The box cover 136 is preferably made of clear plastic, thereby acting as a transparent or clear shield. The latex tubing 106 preferably is removably attached to the front side 118 of the silhouette 110 at each end of the latex tubing 106 such that the latex tubing 106 is vertically oriented. Each end of the latex tubing 106 preferably has a stopcock 140, such that the latex tubing 106 can be filled and drained of a fluid 142 such as water. The inside of the latex tubing 106 represents the subarachnoid space, and the fluid 142 represents cerebrospinal fluid. The latex tubing 106 is preferably held in place by the support 130 and the box cover 136 at a distance of about 0.5 centimeters to about 0.6 centimeters from the silicone sealant 104. This empty space between the latex tubing 106 and the silicone sealant 104 is the (epidural) space 108.

The instructional aid 100 is described in these terms, these dimensions, and using these components and materials for convenience purpose only. It would be readily apparent to one of ordinary skill in the art to manufacture and use a comparable instructional aid 100 using different dimensions, and/or comparable components and materials.

Figure 3:
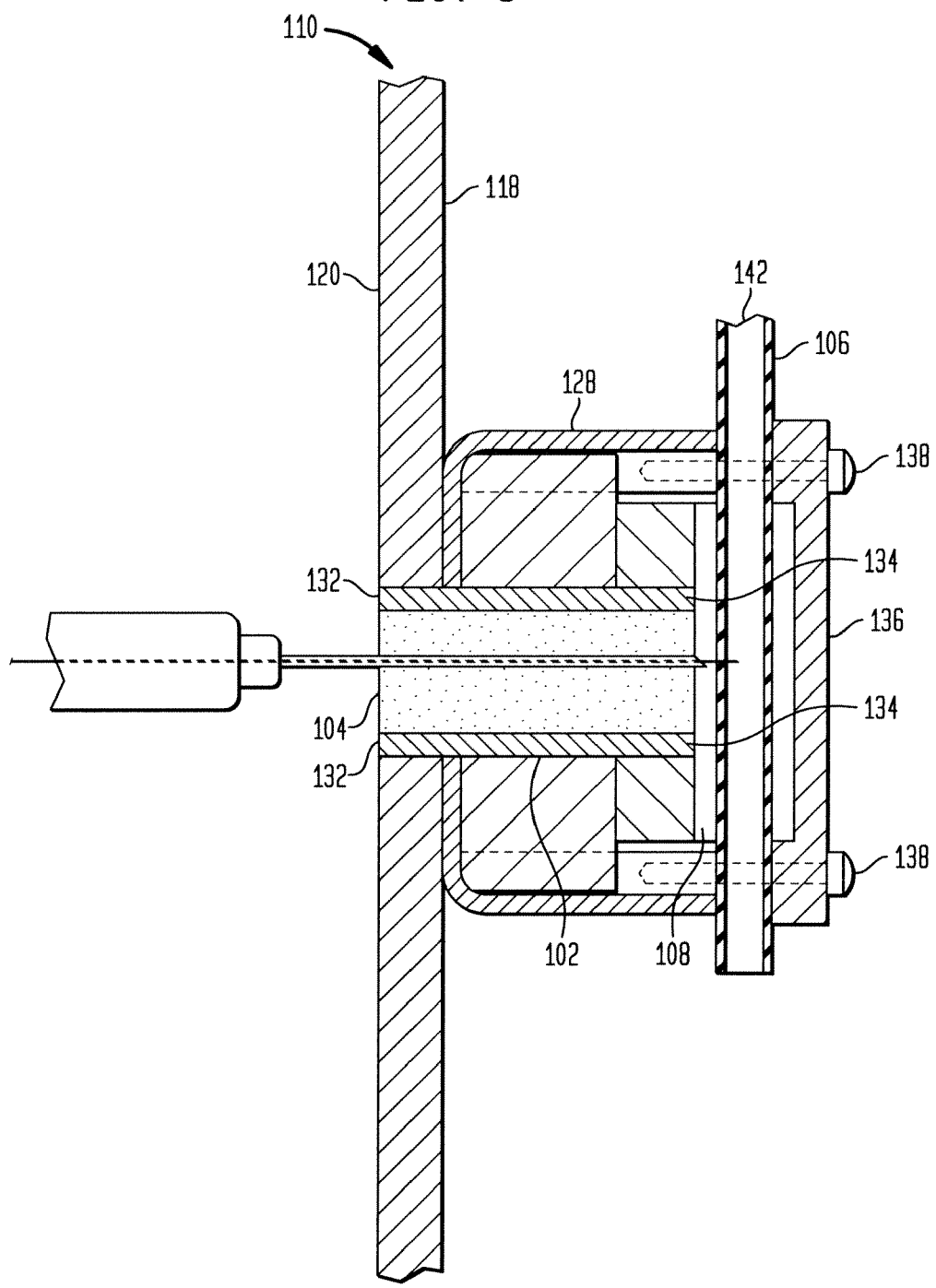
FIG. 3 is a cross-sectional view at line 3-3 of the embodiment of FIG. 1, pierced by a large needle and a small needle or catheter.
Figure 4:
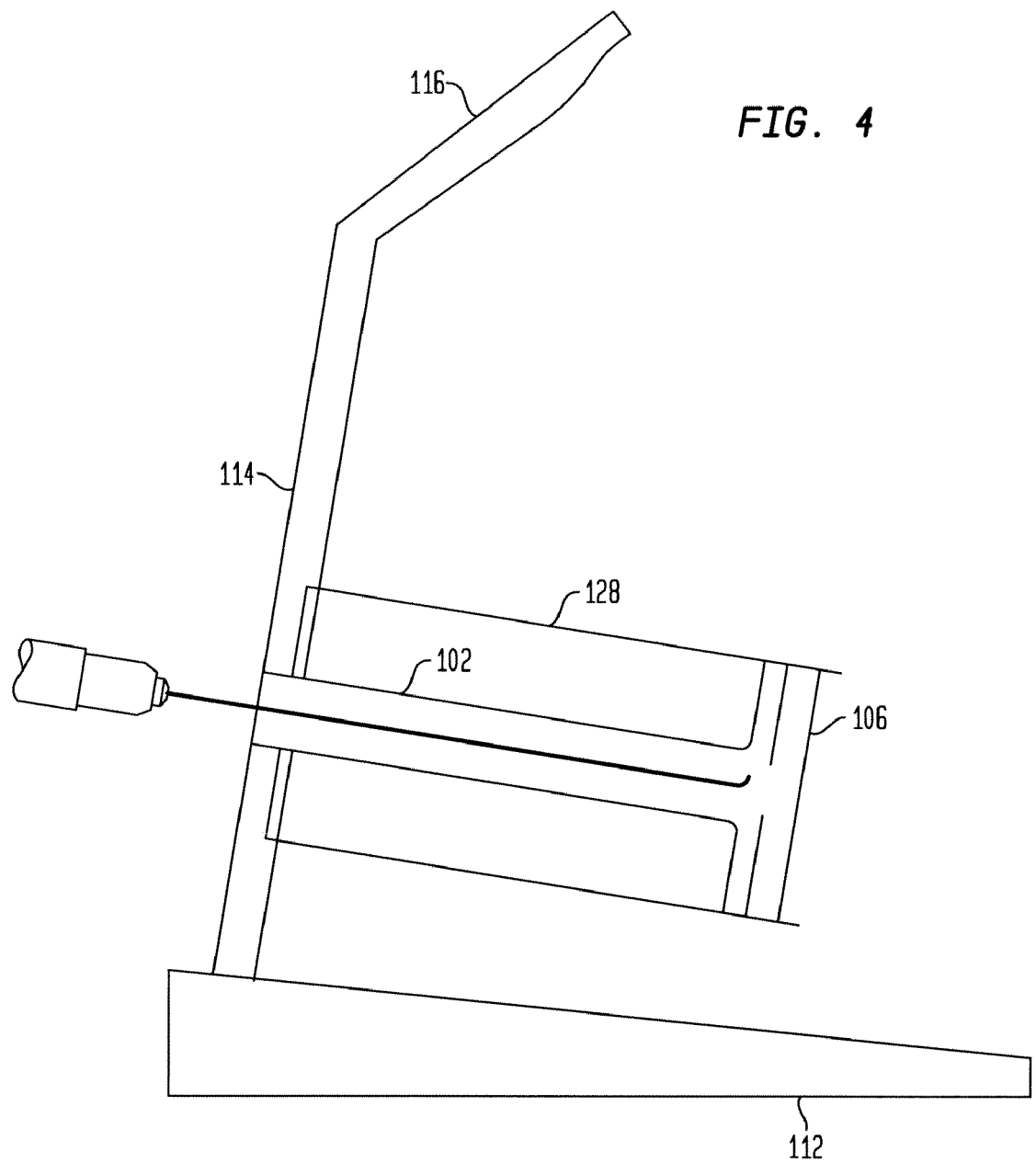
FIG. 4 is a side elevation view of an embodiment of an apparatus of the present invention.
Figure 5:
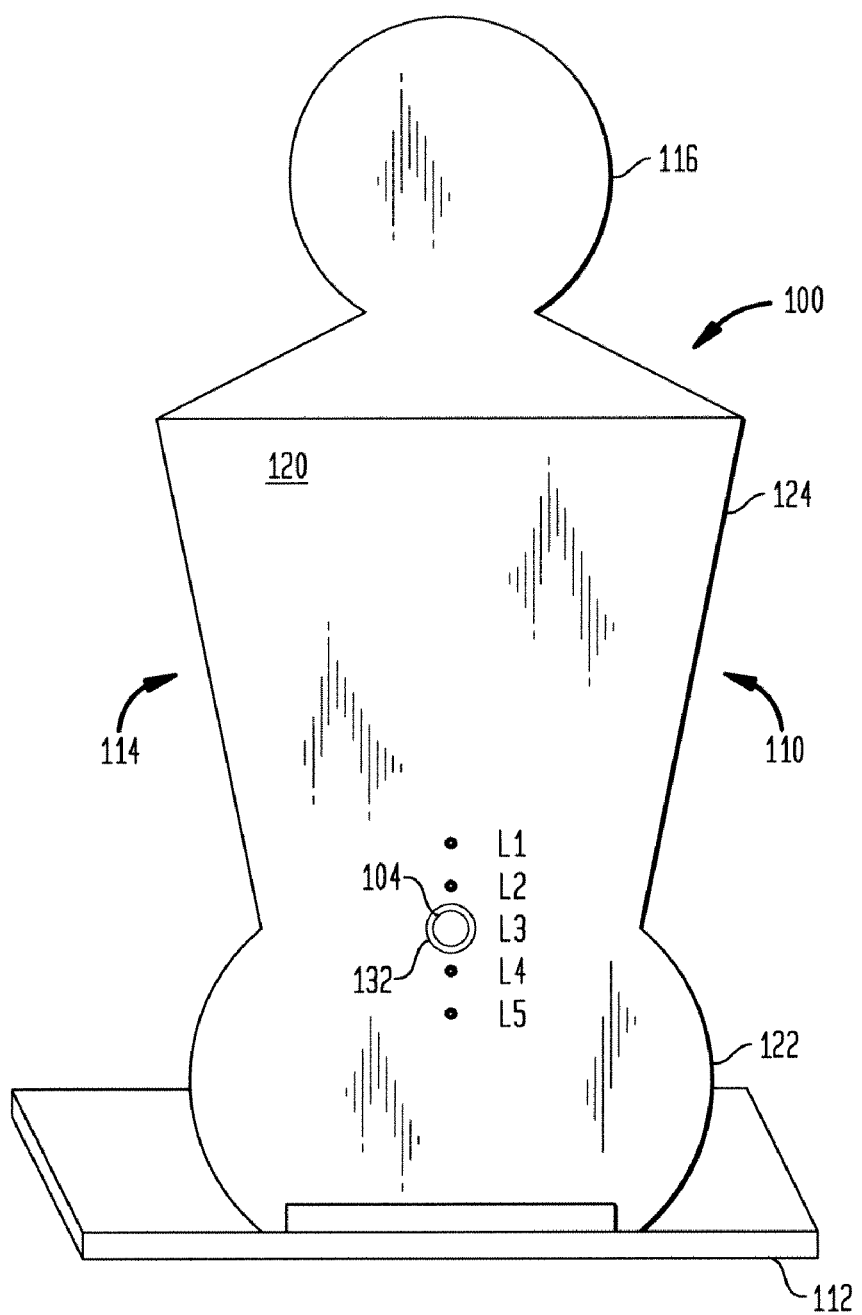
FIG. 5 is a photograph showing the back of an embodiment of an apparatus of the present invention.
Figure 6:
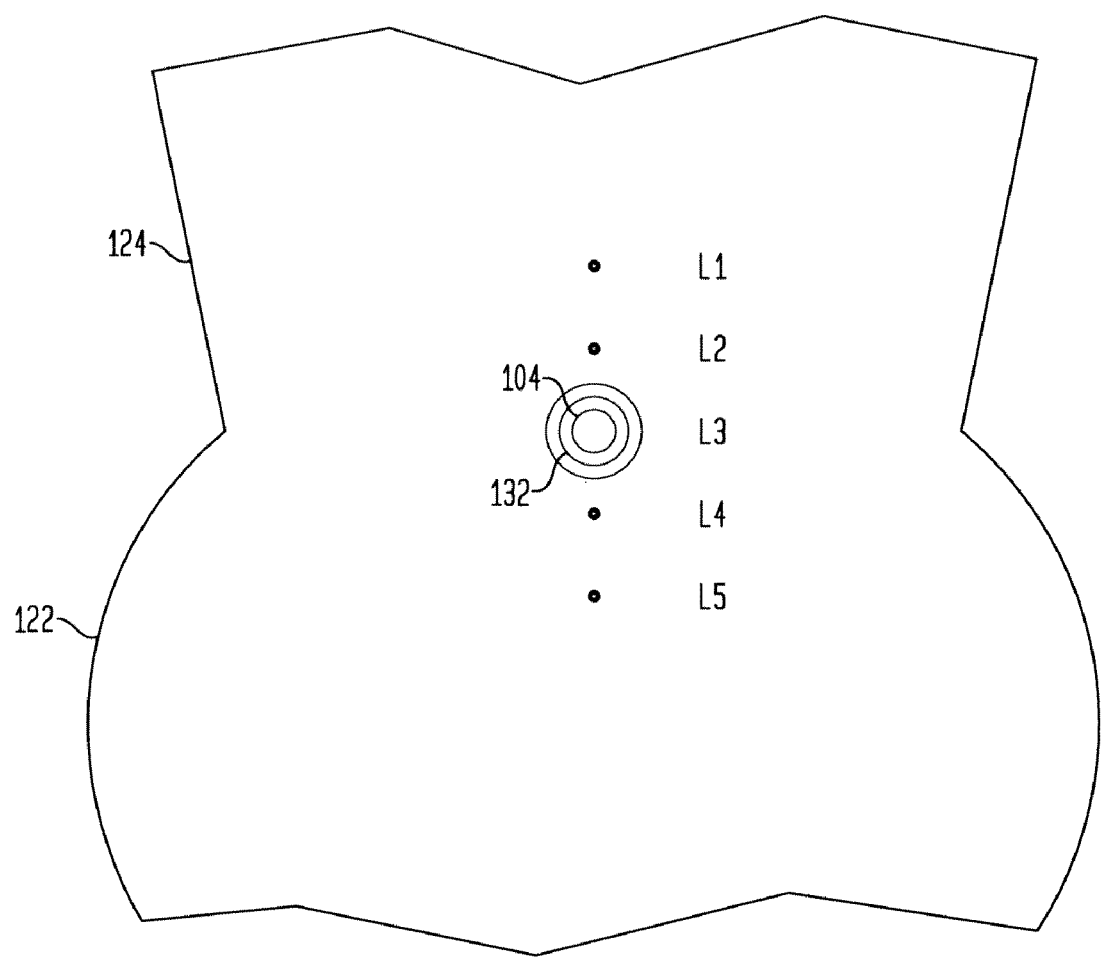
FIG. 6 is a photograph showing a close-up view of the back of the embodiment of FIG. 5.
Figure 7:
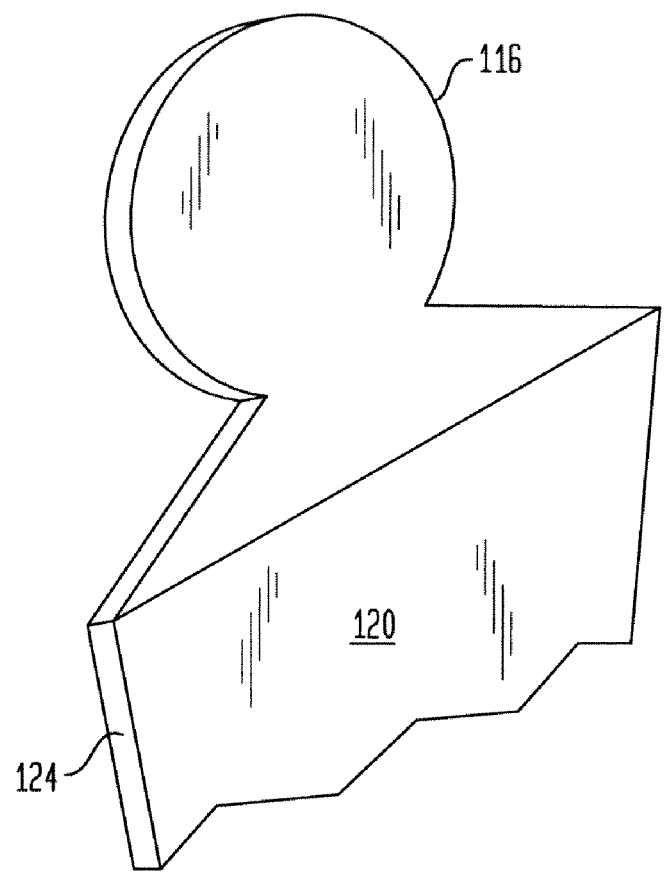
FIG. 7 is a photograph showing a close-up view of the top section of the back of the embodiment of FIG. 5.
Figure 8:
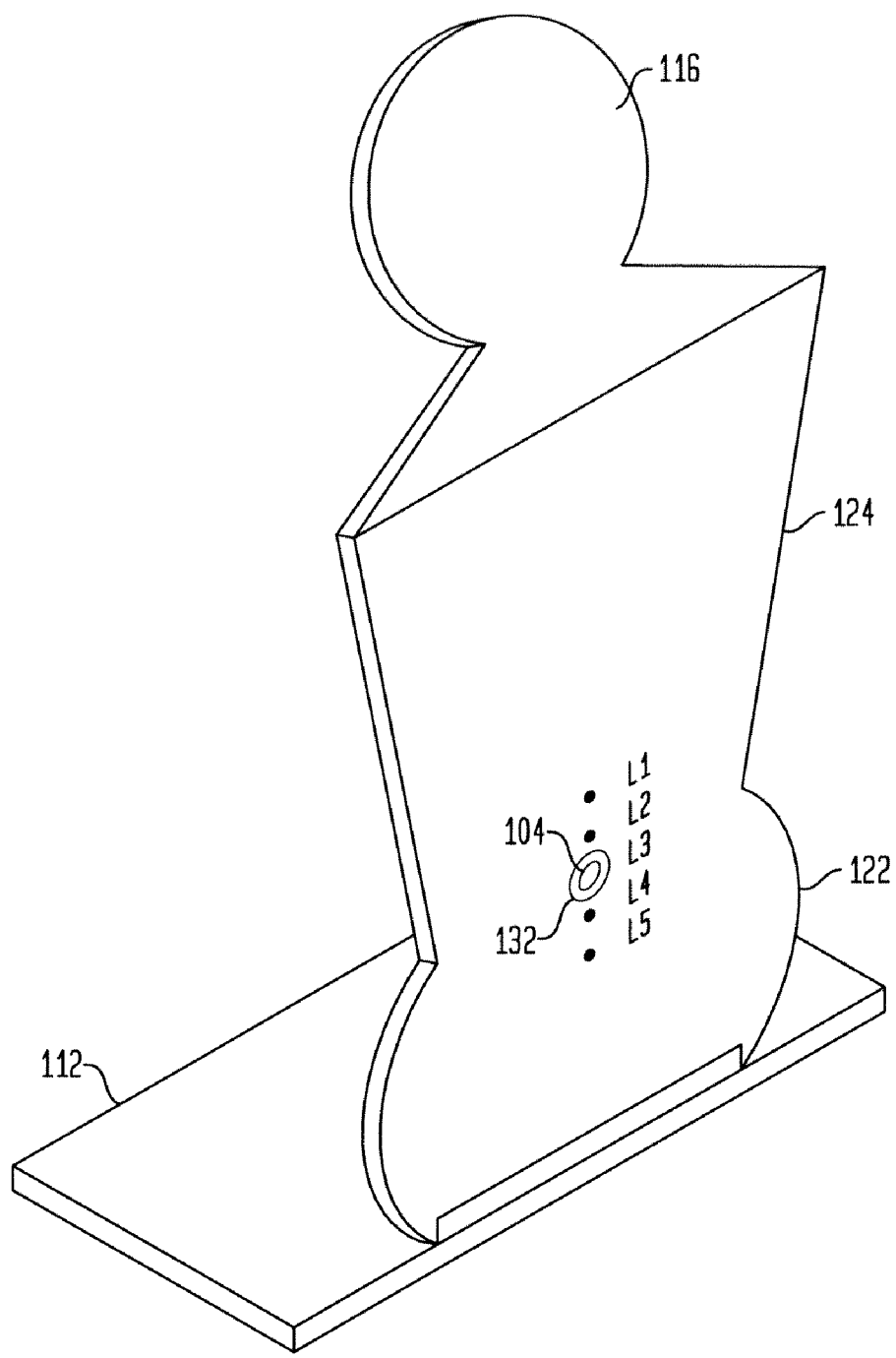
FIG. 8 is a photograph showing a distant view of the back of the embodiment of FIG. 5.
Figure 9:
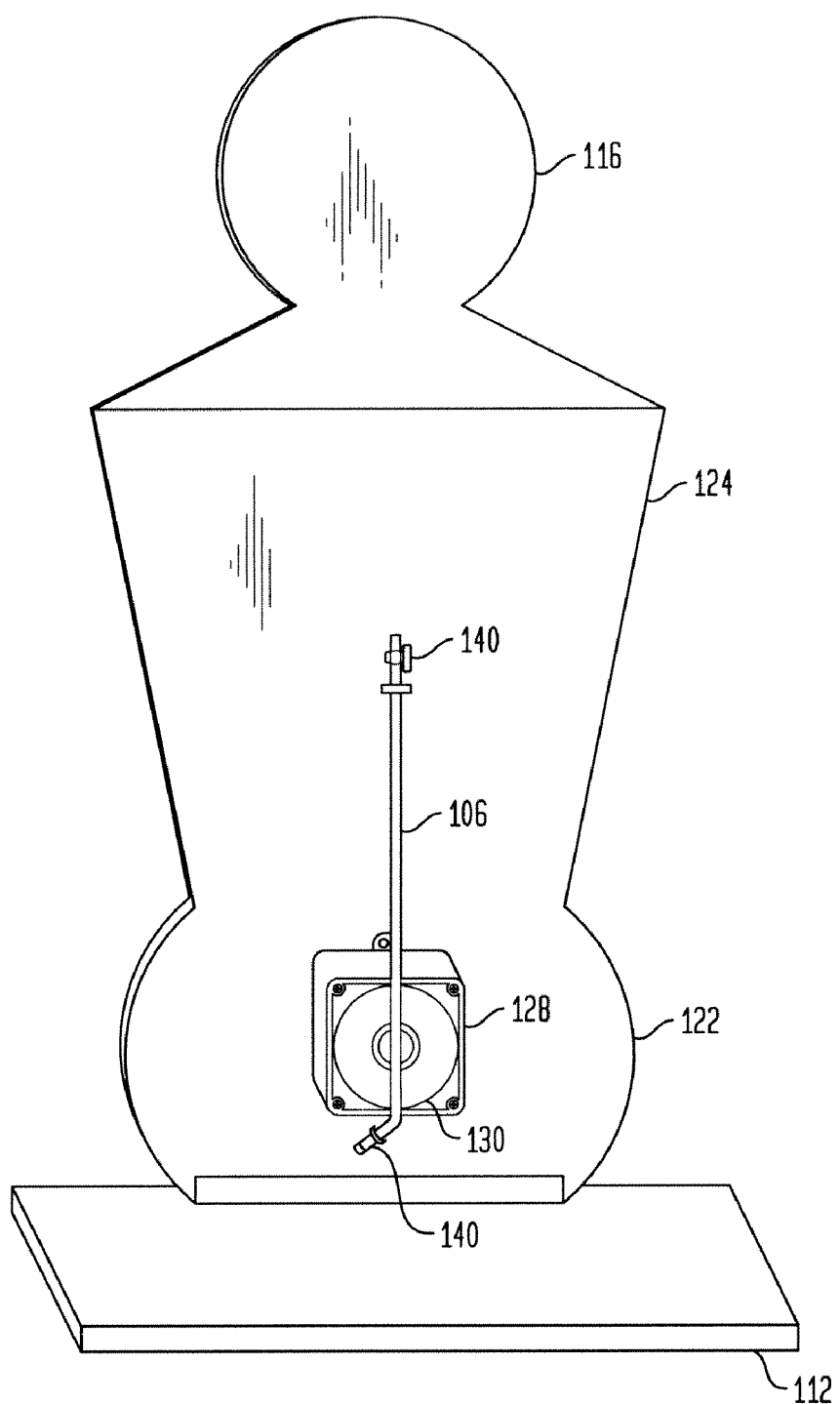
FIG. 9 is a photograph showing the front of the embodiment of FIG. 5.
Figure 10:
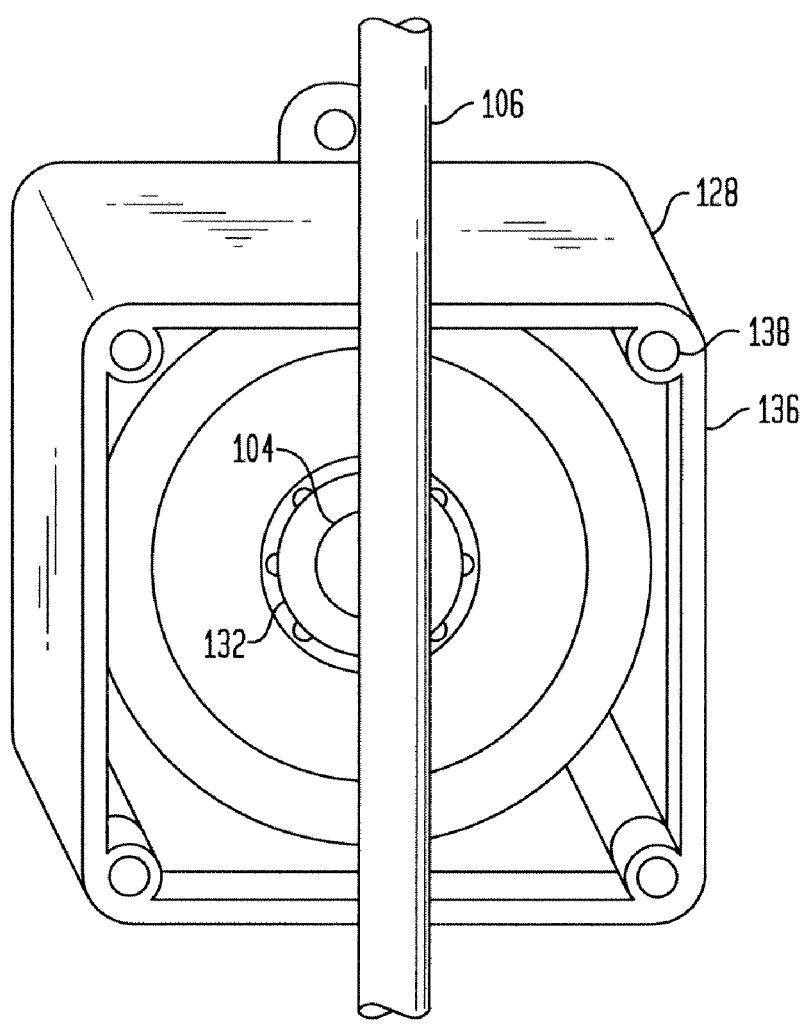
FIG. 10 is a photograph showing a close-up view of the box on the front of the embodiment of FIG. 5.
Figure 11:
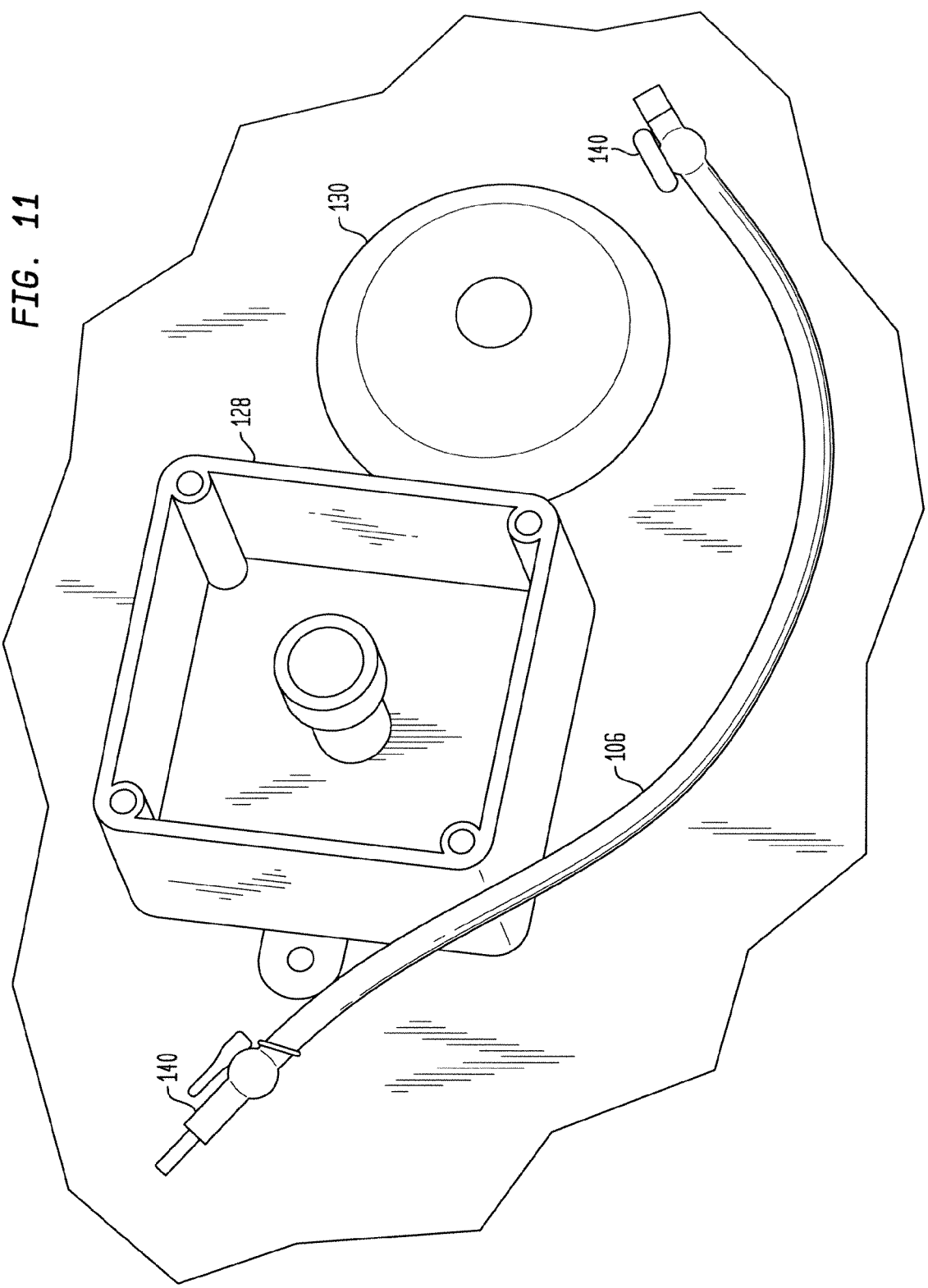
FIG. 11 is a photograph showing the box of the embodiment of FIG. 5 partially disassembled with the box cover absent.
Figure 12:
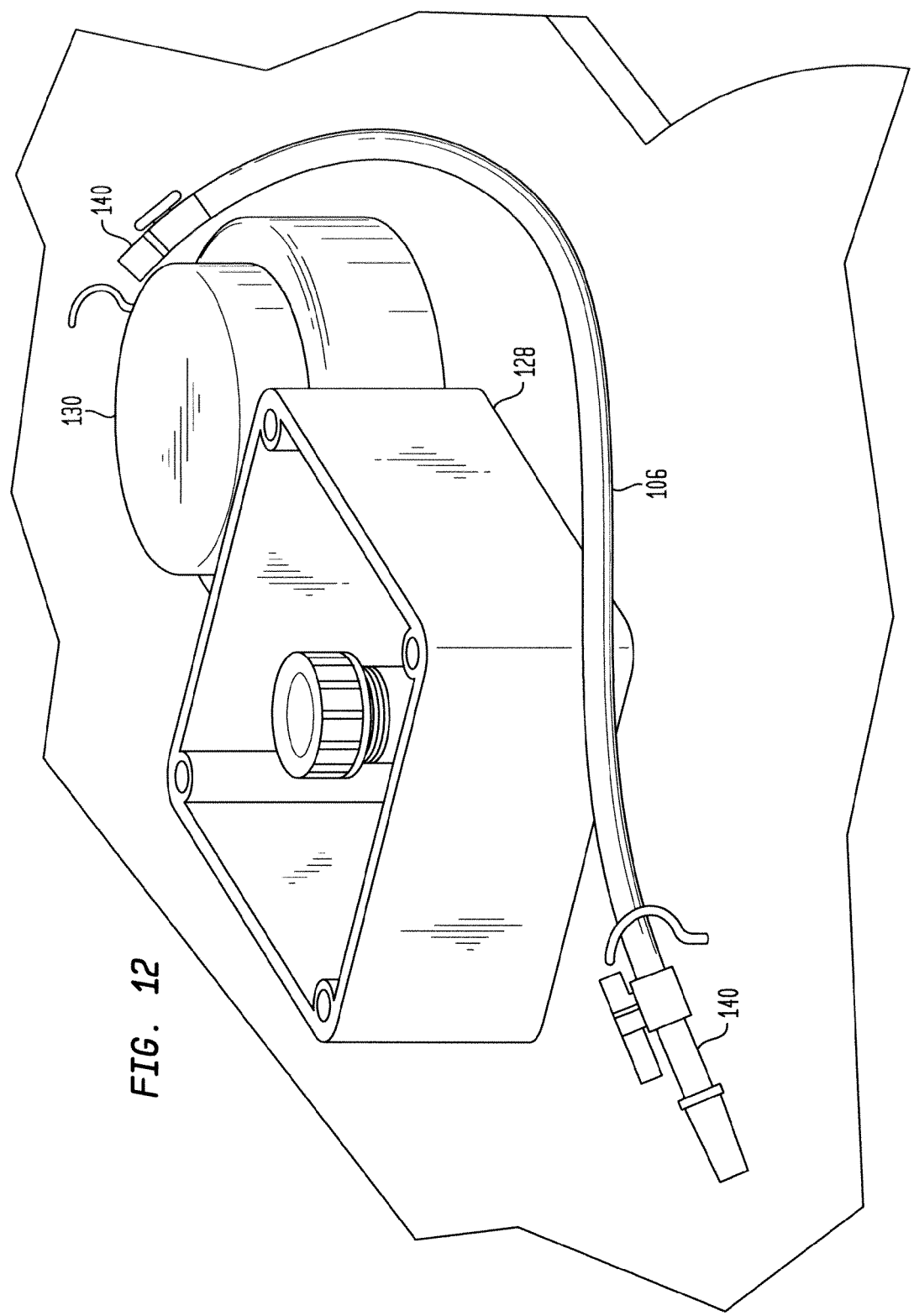
FIG. 12 is a photograph showing an alternate view of FIG. 11.
Figure 13:
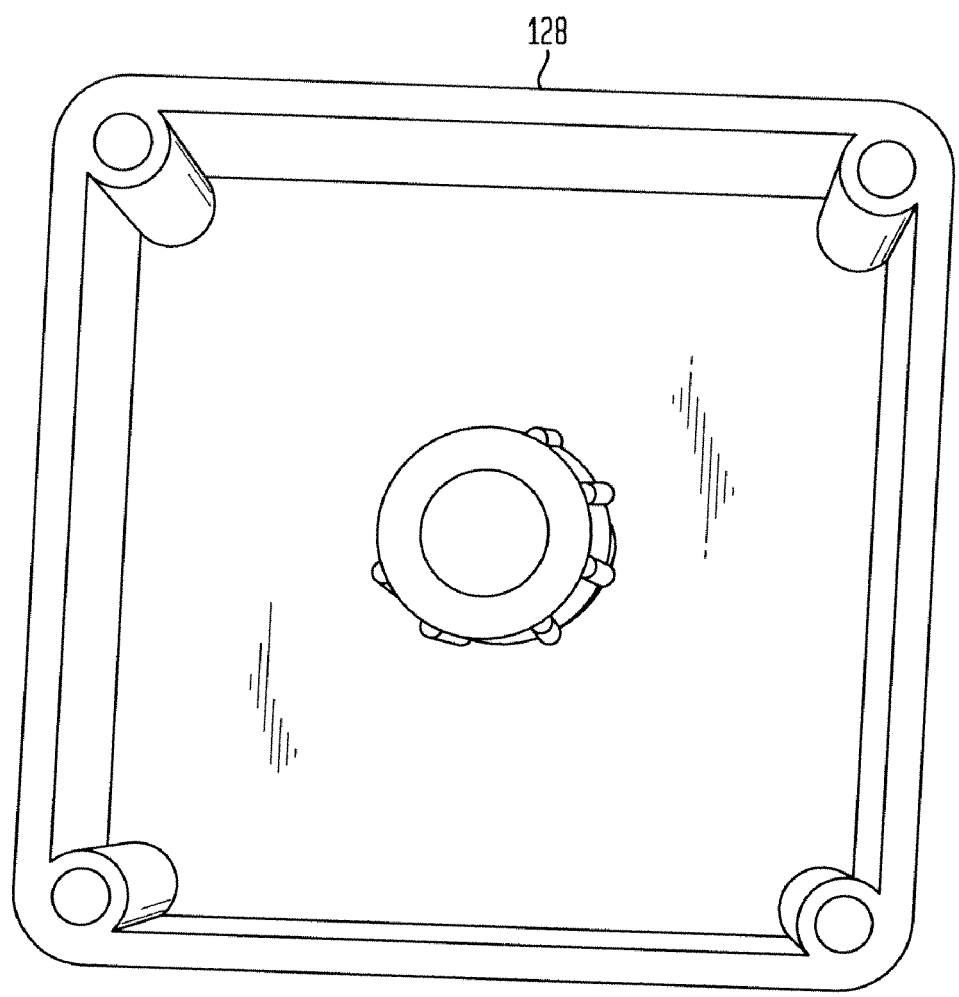
FIG. 13 is a photograph showing a close-up view of the box of FIG. 11.
Figure 14:
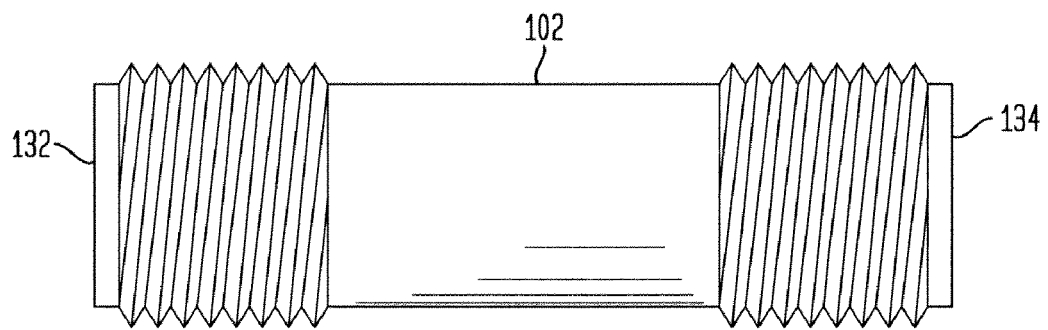
FIG. 14 is a photograph showing the pipe of the embodiment of FIG. 5.
Figure 15:
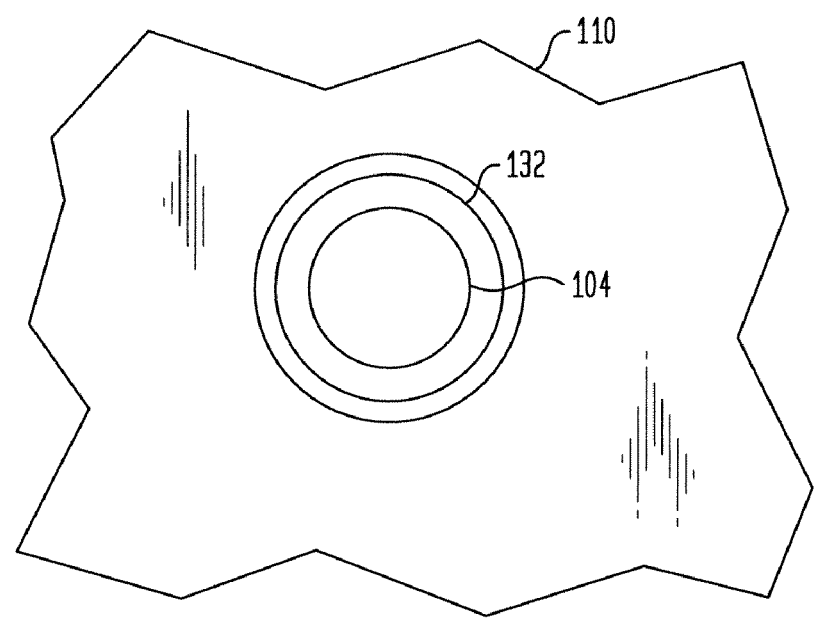
FIG. 15 is a photograph showing the silicone sealant in the pipe of the embodiment of FIG. 5.
Figure 16:
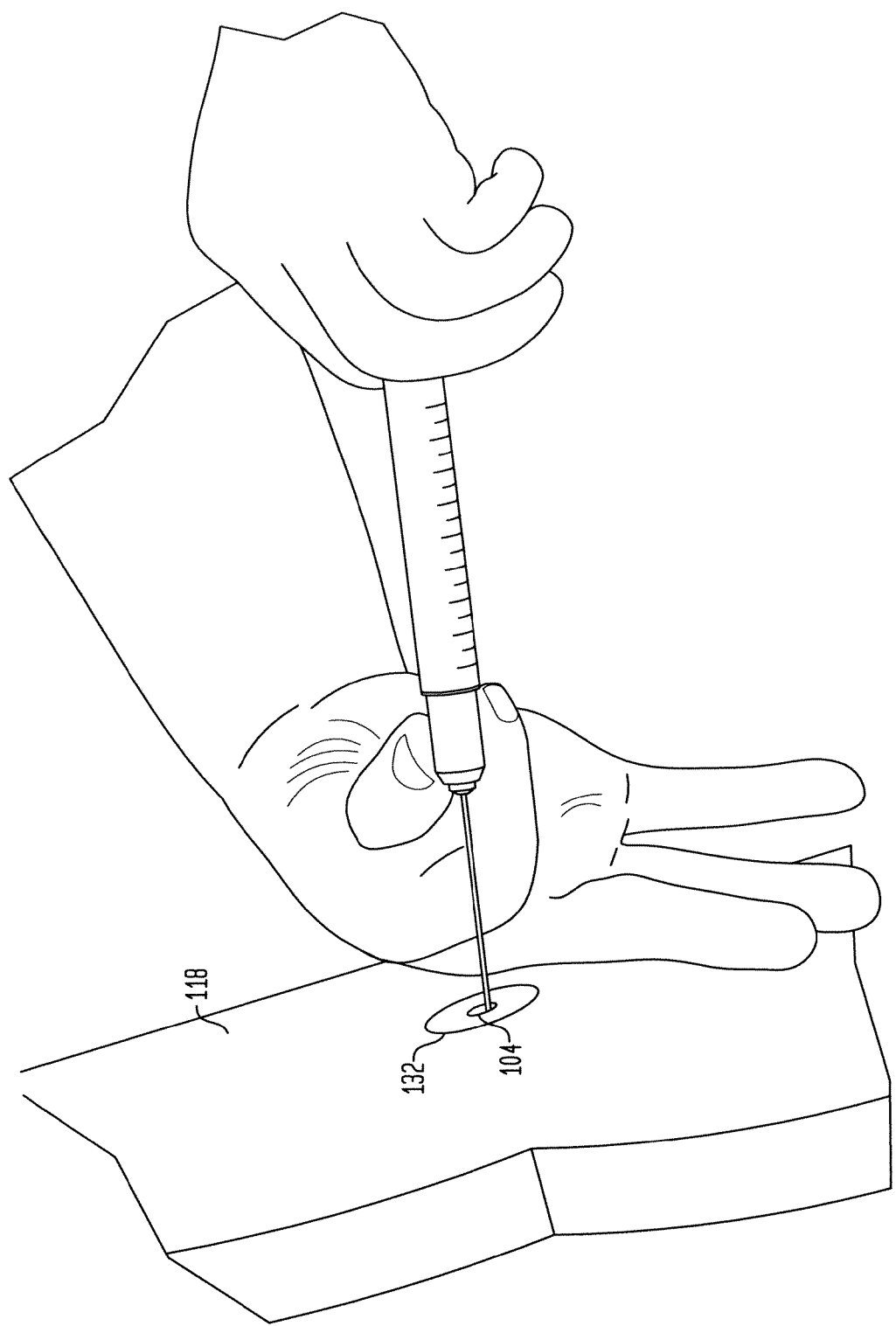
FIG. 16 is a photograph showing an embodiment of a step of the method of the present invention.

As shown in FIGS. 3 and 16, the method of the present invention teaches epidural, epidural catheter, and combined spinal epidural technique. An embodiment of a method for learning administration of spinal and epidural anesthesia comprises the steps of: (a) filling a fluid 142 into the latex tubing 106 of the epidural and combined spinal epidural anesthesia administration instructional aid apparatus 100; (b) inserting a larger needle having a lumen and a tip through the silicone sealant 104 such that the tip of the larger needle rests in the space 108; and (c) inserting a smaller needle having a tip through the lumen of the larger needle such that the tip of the smaller needle pierces the latex tubing 106 and rests inside the latex tubing 106.

A more detailed description of an embodiment of the method of the present invention is as follows. An instructional aid 100 is placed on a table or other suitable surface. The lower stopcock 140 is closed and the upper stopcock 140 is opened. Water or other fluid 142 is introduced into the latex tubing 106 through the upper stopcock 140. The upper stopcock 140 is closed. The student is positioned near the back side 120 of the silhouette 110 such that his or her view of the box 128 and the box cover 136 is blocked by the silhouette 110. The student inserts an eighteen gauge epidural needle through the latex piece on the back side 120 of the silhouette 110 and thereafter through the silicone sealant 104 from the first end 132 of the pipe 102 to the second end 134 of the pipe 102 such that the tip of the epidural needle comes to a rest in the space 108. The student removes the epidural needle stylet. The student inserts a spinal needle through the lumen of the epidural needle such that the tip of the spinal needle pierces the latex tubing 106 and rests in the water 142 inside the latex tubing 106. The student removes the spinal needle stylet such that water 142 flows out of the spinal needle. The student removes the spinal needle out of the epidural needle. The student threads an epidural catheter through the lumen of the epidural needle and into the space 108 such that the tip of the epidural catheter rests in the space 108. The student removes the epidural needle out of the silicone sealant 104 while holding the epidural catheter in place. A teacher or instructor may be positioned near the front side of the silhouette 110 such that he or she can see through the box cover 136 during the performance of the steps of the method by the student. Additional or alternative steps may be performed using the instructional aid 100 such that epidural, epidural catheter, and combined spinal epidural technique may be practiced. For example, other steps commonly performed during epidural and combined spinal epidural anesthesia administration may be simulated using the instructional aid 100.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments.

What is claimed is:

1. An anesthesia administration instructional aid, comprising:
    a pipe;
    a penetrable material in the pipe;
    a reservoir located at a predefined distance from the penetrable material;
    a frame through which the pipe penetrates;
    a box attached to the frame, wherein the box has an open end; and
    a clear cover attached to the box at the open end, wherein the clear cover holds the reservoir in place against the box.

2. The instructional aid of claim 1, wherein the clear cover is removably attached to the box such that the reservoir is removable.

3. The instructional aid of claim 1, wherein the reservoir is removably attached to the frame.

4. An epidural and combined spinal epidural anesthesia administration instructional aid apparatus, comprising:
    a pipe comprising a first end and a second end;
    silicone sealant in the pipe;
    an opaque shield comprising a front side, a aback side, and a hole extending from the front side to the back side, wherein the opaque shield is substantially shaped as a seated human silhouette, and wherein the pipe is positioned in the hole such that the first end of the pipe is about flush with the back side of the opaque shield;
    a box attached to the front side of the opaque shield, wherein the box has an aperture aligned with the hole such that the pipe extends through the aperture and the second end of the pipe is positioned in the box;
    a clear cover attached to the box at the open end; and
    a piece of latex tubing having a stopcock on each tubing end, wherein the piece of latex tubing is positioned at least in part between the box and the clear cover such that the silicone sealant is located about 0.5 centimeters to about 0.6 centimeters from the piece of latex tubing.

5. The apparatus of claim 4, further comprising a support in the box that stabilizes the pipe.

6. The apparatus of claim 4, further comprising a piece of latex removably attached to the back side of the opaque shield such that it covers the first end of the pipe.

7. The apparatus of claim 4, further comprising vertebrae indications on the back side of the opaque shield.

\* \* \* \* \*